No. 889,664. PATENTED JUNE 2, 1908.
T. T. CROZIER.
SEPARATING SYSTEM.
APPLICATION FILED FEB. 1, 1908.
2 SHEETS—SHEET 1.
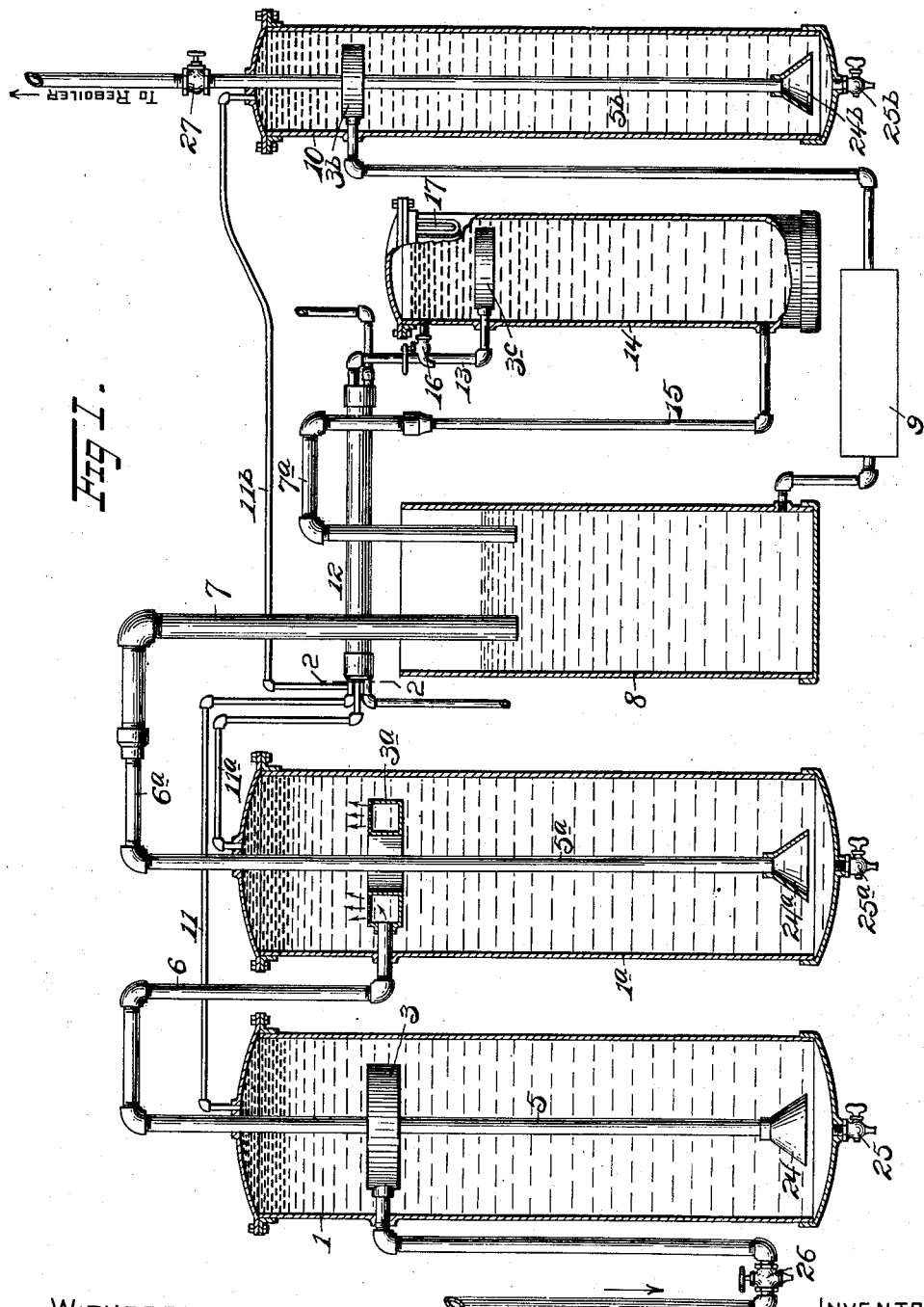
WITNESSES:
F. E. Arthur
J. H. Dunlap.
INVENTOR
Thomas T. Crozier
BY
H. E. Dunlap
ATTORNEY No. 889,664.  
PATENTED JUNE 2, 1908.  
T. T. CROZIER.  
SEPARATING SYSTEM.  
APPLICATION FILED FEB. 1, 1908.  
2 SHEETS—SHEET 2.
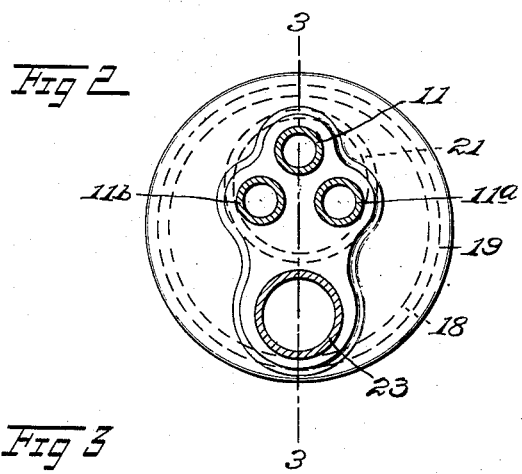
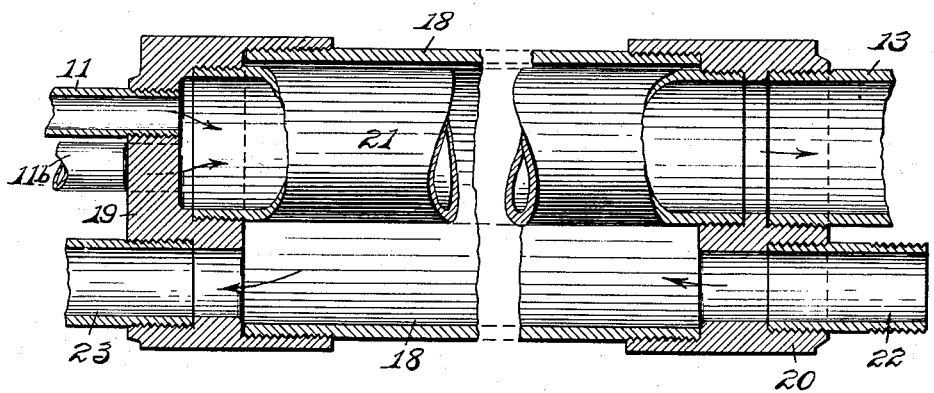
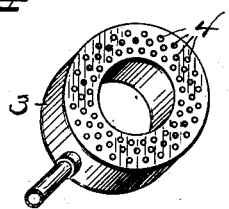
WITNESSES:  
INVENTOR  
Thomas T. Crozier  
BY  
ATTORNEY.

UNITED STATES PATENT OFFICE.

THOMAS T. CROZIER, OF BELLAIRE, OHIO.

SEPARATING SYSTEM.

No. 889,664.

Specification of Letters Patent.

Patented June 2. 1908.

Application filed February 1, 1908. Serial No. 413,906.

*To all whom it may concern:*

Be it known that I, THOMAS T. CROZIER, a citizen of the United States of America, and resident of Bellaire, county of Belmont, and State of Ohio, have invented certain new and useful Improvements in Separating Systems, of which the following is a specification.

My invention relates to improvements in water purification systems, and more particularly to a system of separating the oil and water in ice-manufacturing; and it has for its primary object to provide a simple and efficient means for removing or separating the oil and sediment from the water after it has passed from the condenser in the process of ice-making.

A further object of the invention is to provide means for purifying the water as it passes from the condenser to the reboiler in ice-manufacturing, and for collecting in commercially usable form the oil obtained from said water.

With these and other objects in view, the invention finally consists in the particular construction, arrangement and combination of parts which will hereinafter be fully described, reference being herein had to the accompanying drawings, forming a part of this specification, in which—

Figure 1 is a central vertical sectional view of the invention; Fig. 2 is a section on the line 2—2, Fig. 1, showing the oil-cooling device in end elevation; Fig. 3 is a longitudinal sectional view of said cooling device, the section being taken on the line 3—3, Fig. 2; and Fig. 4 is a perspective view of a spraying ring.

Referring to said drawings, in which like reference - numerals designate like parts throughout the several views—1 indicates an air-tight separating tank to which water is delivered from the condenser through the medium of a pipe 2 leading from said condenser, and a spraying ring 3 located within said tank. Said spraying ring is circular in form, is preferably rectangular in cross section, and has in its top a great plurality of minute perforations 4 adapted for discharging under pressure the water delivered thereto in minute sprays, thus breaking up said water into small particles and facilitating the separation of the oil therefrom. Extending vertically into said tank 1 and terminating near the bottom thereof is a pipe 5 in which the water in the tank 1 rises, and which connects at a point above the level of the top of said tank with a pipe or series of pipes 6 leading to a second air-tight separating tank 1$^a$. Said second tank has a spraying ring 3$^a$ located therein, and also has a pipe 5$^a$, similar to said pipe 5, connected to a pipe 6$^a$, as shown. Coupled to said pipe 6$^a$ is a pipe 7 of larger gage which depends at its lower end below the normal water level of the ordinary float-tank 8 and which is designed to prevent the formation of a siphon which would withdraw all water from the separating tanks.

A pump 9 is employed, as ordinarily, for forcing water from the float-tank 8 to the reboiler; but, for the purpose of further separating the oil and water after it has become partially cooled and while under great pressure, an air-tight tank 10, termed a "pressure separator", is interposed between said pump and said reboiler, the water being delivered to said tank 10 through a spraying ring 3$^b$ and passing therefrom through a pipe 5$^b$.

The bulk of the oil contained by the water as it reaches each of the tanks 1, 1$^a$, and 10, successively, rises to the top in said tanks, and, through pressure, is forced out through pipes 11, 11$^a$ and 11$^b$, respectively connected with the tops of said tanks, to a cooling device 12, from which it is discharged through a pipe 13 and a spraying ring 3$^c$ to an oil-tank 14.

Such water as finds its way to the oil-tank 14 sinks to the bottom and is forced out through a pipe 15 to the float-tank. To prevent siphonic action, a pipe 7$^a$ of relatively larger gage is connected to said pipe 15, as shown.

A cock 16 is provided near the top of the oil-tank 14 through which the oil is skimmed from the top. A sight-glass 17 is preferably employed in said tank. The cooling device 12 consists of a tube 18 having heads 19 and 20 in its opposite ends. Extending within said tube 18 from one end to the other and having its ends seated in said heads 19 and 20 is a relatively smaller pipe 21 with which, at one end, the pipes 11, 11$^a$ and 11$^b$ communicate. The pipe 13 connects at the opposite end with said pipe 21 and leads to the oil-tank 14. Communicating with said tube 18 through the head 20 is a cold-water supply pipe 22, and communicating with said tube at its opposite end through the head 19 is a discharge pipe 23 leading to a drain or sewer (not shown).

The flow of cold water through the tube 18 is continuous, and, as is obvious, the contact of said cold water with the pipe 21 carrying the oil serves to cool said oil in its passage through said pipe 21 and thus to render it more readily separable from the water with which it is commingled.

Inverted funnel-like cups 24, 24ª and 24ᵇ are respectively provided on the lower ends of the pipes 5, 5ª and 5ᵇ, said cups being designed to allay to a marked degree agitation of the water in the bottoms of the tanks 1, 1ª and 10 as it enters said pipes. Drain-cocks 25, 25ª and 25ᵇ are respectively provided in the bottoms of said tanks 1, 1ª and 10, as shown, by means of which sediment collected in the bottoms of said tanks may be drained off. A valve 26 is provided at an appropriate point in the pipe 2 by means of which the flow of water from the condenser may be interrupted when desired. A valve 27 is located between the tank 10 and the reboiler by means of which the return of water is prevented when the pump is stopped. The spraying rings are preferably located near the tops of the respective tanks in order to avoid agitating the water at the point where it enters the discharge pipes.

Having thus described my invention, what I claim as new, and desire to secure by Letters Patent, is—

1. In a water purification system for ice-plants, the combination with a float tank, of a series of separating tanks adapted to be interposed between a condenser and the float tank, a pipe for delivering water from the condenser to the first tank in the series, a pipe connecting each tank with the next in series, a pipe for delivering water from the last tank in series to said float tank, means for preventing siphonic action in the last-mentioned pipe, a pump for forcing water from said float tank to a reboiler, a pressure separating tank interposed between said pump and the reboiler, an oil tank, and pipes leading from each of said separating tanks to said oil tank.

2. In a water purification system for ice-plants, the combination with a float tank, of a series of separating tanks adapted to be interposed between a condenser and the float tank, a pipe for delivering water from the condenser to the first tank in the series, a pipe connecting each tank with the next in series, a pipe for delivering water from the last tank in series to said float tank, means for preventing siphonic action in the last-mentioned pipe, a pump for forcing water from said float tank to a reboiler, a pressure separating tank interposed between said pump and the reboiler, an oil tank to which oil collected in the tops of said separating tanks is delivered, and oil-cooling means interposed between said separating tanks and said oil tanks.

3. In a device of the character described, a series of separating tanks adapted to be interposed between an alembic and a receiving tank, a receiving pipe leading from the alembic to the first tank in the series, overflow pipes leading from each tank to the next succeeding tank of the series, means for preventing siphonic action in said pipe, a pump for forcing water from the receiving tank to a reboiler, a pressure separator interposed between said receiving tank and said reboiler, an oil tank, and pipes leading from each of the separating tanks and from the pressure separator to said oil tank.

4. In a device of the character described, a series of separating tanks adapted to be interposed between an alembic and a receiving tank, a receiving pipe leading from the alembic to the first tank in the series, overflow pipes leading from each tank to the next succeeding tank of the series, means for preventing siphonic action in said pipe, a pump for forcing water from the receiving tank to a reboiler, a pressure separator interposed between said receiving tank and said reboiler, an oil tank, pipes leading from each of the separating tanks and from the pressure separator to said oil tank, and a cooling device associated with the last-mentioned pipes.

5. In a device of the character described, a series of separating tanks adapted to be interposed between an alembic and a receiving tank, a receiving pipe leading from the alembic to the first tank in the series, overflow pipes leading from each tank to the next succeeding tank of the series, means for preventing siphonic action in said pipe, a pump for forcing water from the receiving tank to a reboiler, a pressure separator interposed between said receiving tank and said reboiler, an oil tank to which oil collected in the separating tanks and in the pressure separator is conveyed, and means for cooling said oil in its passage to said oil tank.

6. In a device of the character described, a series of air-tight tanks adapted to be interposed between an alembic and a receiving tank for successively receiving, through pressure, the product of said alembic, means within each tank for effecting the breaking up of water delivered thereto into minute particles, a float tank to which water is delivered from the last tank of the series, a pump for forcing water from the float tank to a reboiler, and a pressure separator tank arranged intermediate said pump and the reboiler.

In testimony whereof I affix my signature in presence of two subscribing witnesses.

THOMAS T. CROZIER.

Witnesses:
J. H. DUNLAP,
H. E. DUNLAP.